United States Patent
Sella et al.

(10) Patent No.: US 9,208,352 B2
(45) Date of Patent: Dec. 8, 2015

(54) LFSR WATERMARK SYSTEM

(71) Applicant: Cisco Technology Inc., San Jose, CA (US)

(72) Inventors: Yaron Sella, Beit Nekofa (IL); Harel Cain, Jerusalem (IL); Michal Devir, Haifa (IL)

(73) Assignee: CISCO TECHNOLOGY INC., San Jose, CA (US)

( * ) Notice: Subject to any disclaimer, the term of this patent is extended or adjusted under 35 U.S.C. 154(b) by 56 days.

(21) Appl. No.: 14/176,400

(22) Filed: Feb. 10, 2014

(65) Prior Publication Data

US 2015/0227760 A1    Aug. 13, 2015

(51) Int. Cl.
G06F 21/62    (2013.01)
G06F 21/64    (2013.01)

(52) U.S. Cl.
CPC ............ *G06F 21/64* (2013.01); *G06F 21/6209* (2013.01)

(58) Field of Classification Search
CPC .............................. G06F 21/64; G06F 21/6209
See application file for complete search history.

(56) References Cited

U.S. PATENT DOCUMENTS

| | | | |
|---|---|---|---|
| 5,664,016 A * | 9/1997 | Preneel et al. ................... 380/28 |
| 6,141,669 A * | 10/2000 | Carleton ........................ 708/252 |
| 6,226,742 B1 * | 5/2001 | Jakubowski et al. ......... 713/170 |
| 6,901,515 B1 | 5/2005 | Muratani |
| 7,020,304 B2 | 3/2006 | Alattar et al. |
| 7,158,653 B2 | 1/2007 | Fletcher et al. |
| 8,135,168 B2 | 3/2012 | Geyzel et al. |
| 8,189,863 B1 | 5/2012 | Rucklidge |
| 8,300,884 B2 | 10/2012 | Sharma |
| 2002/0169972 A1 | 11/2002 | Tanaka et al. |
| 2003/0009671 A1 * | 1/2003 | Yacobi et al. ................. 713/176 |
| 2003/0152225 A1 * | 8/2003 | Kunisa ........................... 380/210 |
| 2004/0143742 A1 * | 7/2004 | Muratani ....................... 713/176 |
| 2005/0036607 A1 * | 2/2005 | Wan et al. ........................ 380/28 |

(Continued)

FOREIGN PATENT DOCUMENTS

| | | |
|---|---|---|
| CN | 101488214 B | 7/2011 |
| WO | WO 98/11492 | 3/1998 |

OTHER PUBLICATIONS

Arun, R. et al. "A Distortion Free Relational Database Watermarking Using Patch Work Method," Proceedings of the International Conference on Information Systems Design and Intelligent Applications 2012 (India 2012) held in Visakhapatnam, India, Jan. 2012, pp. 531-538.*

(Continued)

*Primary Examiner* — Darren B Schwartz
(74) *Attorney, Agent, or Firm* — Hahn Loeser & Parks LLP

(57) ABSTRACT

In one embodiment, a system including a processor is operative to receive a content item including a watermark encoding a series of data values of an output stream of a linear feedback shift register initialized with a seed including an information element and an assurance value, the shift register having a plurality of states each including a first and second value, identify at least part of the watermark in the content item, extract at least some of the data values from the at least part of the identified watermark, process at least some of the extracted data values yielding the initial state of shift register, and authenticate the first value of the initial state using the second value of the initial state in order to confirm that the first value is indeed the information element included in the seed processed by the shift register.

18 Claims, 5 Drawing Sheets

(56) References Cited

U.S. PATENT DOCUMENTS

| | | | |
|---|---|---|---|
| 2006/0013395 A1* | 1/2006 | Brundage et al. | 380/255 |
| 2009/0041237 A1 | 2/2009 | Takashima et al. | |
| 2009/0193065 A1* | 7/2009 | Vijayarangan et al. | 708/209 |
| 2009/0222667 A1* | 9/2009 | Vauclair et al. | 713/175 |
| 2010/0332826 A1 | 12/2010 | Lin | |
| 2011/0231464 A1* | 9/2011 | Rivoir | G06F 7/584 708/232 |
| 2012/0076293 A1* | 3/2012 | Smith et al. | 380/28 |
| 2012/0076346 A1 | 3/2012 | Brundage et al. | |
| 2015/0200773 A1* | 7/2015 | Sella | H04L 9/0816 380/277 |

OTHER PUBLICATIONS

Harjito, Bambang et al. "Watermarking Technique for Copyright Protection of Wireless Sensor Network Data using LFSR and Kolmogorov Complexity," Dec. 3-5, 2012, MoMM2012.*

Kumar, S. Bhargav et al. "LFSR Based Watermark and Address Generator for Digital Image Watermarking SRAM," 2012, International Journal of Computer & Organization Trends, vol. 2, Issue 3.*

A. Ahmad et al., "On Locking Conditions in M-Sequence Generators for the Use in Digital Watermarking," *International Conference on Methods and Models in Computer Science* (2009).

Michael Arnold et al., *Techniques and Applications of Digital Watermarking and Content Protection* (Artech House 2003).

Chunhua Dong et al., "Zero Watermarking for Medical Images Based on DFT and LFSR," *International Conference on Computer Science and Automation Engineering*, vol. 1, pp. 22-26 (IEEE 2012).

S. Bhargav Kumar et al., "LFSR Based Watermark and Address Generator for Digital Image Watermarking SRAM," *International Journal of Computer & Organization Trends*, vol. 2, Issue 3, pp. 73-79 (2012).

S. Bhargav Kumar, "On-Chip Address and Test Pattern Generation for Image Watermarking SRAM" *International Journal of Advanced Scientific and Technical Research*, issue 3, vol. 2, pp. 389-397 (Apr. 2013).

Xiangxue Li et al., "LFSR-Based Signatures With Message Recovery," *International Journal of Network Security*, vol. 4 No. 3, pp. 266-270 (May 2007).

Chunhua Dong et al., "Zero Watermarking for Medical Images Based on DFT and LFSR," *International Conference on Computer Science and Automation Engineering*, vol. 1, pp. 22-26 (IEEE 2012).

S. Bhargav Kumar et al., "LFSR Based Watermark and Address Generator for Digital Image Watermarking SRAM," *International Journal of Computer & Organization Trends*, vol. 2 Issue 3, pp. 73-79 (2012).

Xiangxue Li et al., "LFSR-Based Signatures With Message Recovery," *International Journal of Network Security*, vol. 4, No. 3, pp. 266-270 (May 2007).

* cited by examiner

LFSR WATERMARK SYSTEM

FIELD OF THE INVENTION

The present invention relates to watermark detection.

BACKGROUND OF THE INVENTION

By way of introduction, the process of hiding or embedding information in a computer-aided fashion in a video, audio or any suitable media item generally comes under the overall category of watermarking. The watermarking process is typically called "digital watermarking" when the embedded data identifies the media-item itself or the content-owner, and sometimes known as "forensic fingerprinting" when the embedded data identifies the consumer of the media-item. In forensic fingerprinting, if a user were to leak some piece of content, his/her identity (ID) could be traced using information hidden in the content. A common watermarking requirement is to make the leaker detection/identification process as efficient as possible, so that even a small fragment ("window") of the media-item would allow traitor tracing (identifying an illegitimate distributor (traitor) of the media item).

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

There is provided in accordance with an embodiment of the present invention a system including a processor, and a memory to store data used by the processor, wherein the processor is operative to receive a media content item including a watermark embedded in the media content item, the watermark encoding a series of data values of an output stream of a linear feedback shift register initialized with a seed including an information element and an assurance value, the information element consisting of N bits, the assurance value consisting of P bits, the linear feedback shift register having a plurality of states including an initial state, each of the states including a first value of N bits and a second value of P bits, identify at least part of the watermark in the media content item, extract at least some of the data values from the at least part of the identified watermark, process at least some of the extracted data values yielding the initial state of linear feedback shift register, and authenticate the first value of the initial state using the second value of the initial state in order to confirm that the first value of the initial state is indeed the information element which was included in the seed processed by the linear feedback shift register.

Description Continued

For the sake of simplicity, the use of the term "watermarking", in all grammatical forms, as used in the specification and claims, is defined to include both digital watermarking and forensic fingerprinting.

A general problem in the field of watermarking is that due to errors in the detection process or a framing attack (whereby users may try to alter the watermark in such a way so as to implicate someone else as illegitimately distributing the content), an innocent consumer/user might be falsely accused of being the leaker. Furthermore, two or more users might collude in order to frame another user.

Figure 1:
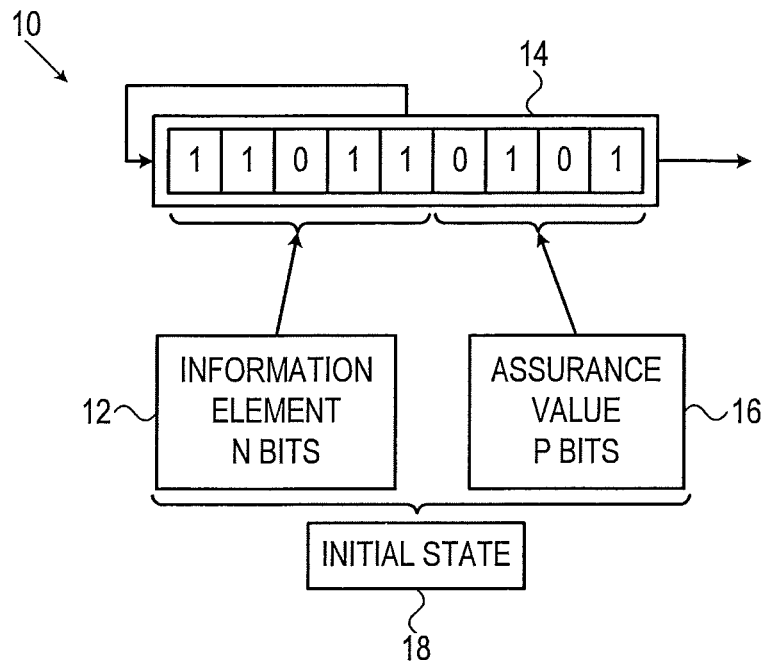
FIG. 1 is a partly pictorial, partly block diagram view of an LFSR based watermarking system constructed and operative in accordance with an embodiment of the present invention.

Reference is now made to FIG. 1, which is a partly pictorial, partly block diagram view of a linear feedback shift-register (LFSR) based watermarking system 10 constructed and operative in accordance with an embodiment of the present invention.

The watermarking system 10 may be used to embed any suitable data item or information element 12 as a watermark in any suitable media content item, for example, but not limited to, video, audio, other data or an E-book. The information element 12 may include an ID of the media object owner, an ID of the media object (e.g.: movie ID), an ID of the end-user/subscriber, a timestamp or device ID by way of example only.

The watermarking system 10 includes a linear-feedback shift register LFSR 14. A linear-feedback shift register (LFSR) is a shift register whose input bit is a linear function of its previous state.

The LFSR 14 is initialized with a seed which includes the information element 12 and an assurance value 16. The information element 12 consists of N bits and the assurance value 16 consists of P bits.

The assurance value 16 is used during detection of the watermark to provide assurance that the information element 12 is indeed the information element 12 processed by the LFSR 14 yielding an output which was embedded as the watermark in the media content item. The assurance value 16 may be a fixed value associated with the information element 12 or a function of the information element 12. By way of example only, the assurance value 16 may be a cryptographic hash of the information element 12, a message authentication code on the information element 12, a cyclic redundancy check (CRC) of the information element 12, or simply a long enough fixed pattern of bits.

The initial value of the LFSR 14 is called an initial state 18 of the LFSR 14. The LFSR 14 may be any suitable type of LFSR, for example, but limited to, a Fibonacci or Galois linear feedback shift register. The LFSR 14 has a length of at least N plus P bits.

The operation of the register 14 is deterministic. Therefore, the stream of values produced by the register 14 is completely determined by its current (or previous) state. Likewise, because the register has a finite number of possible states, it must eventually enter a repeating cycle. However, an LFSR with a well-chosen feedback function can produce a sequence of bits which appears random and which has a very long cycle. The LFSR 14 typically is a maximum recursion linear feedback shift register with maximal recurrence relation, as is known in the art. A maximal recursion LFSR is an LFSR whose characteristic polynomial is primitive.

An LFSR can be rolled forward and backward. The following Python code snippet shows LFSR roll forward and then LFSR roll back. The example is based on an LFSR Polynomial of $x^{16}+x^{14}+x^{13}+x^{11}+1$.

```
def next(lfsr):
    out_bit = lfsr & 1;
    new_bit = (out_bit ^ (lfsr >> 2) ^ (lfsr
        >> 3) ^ (lfsr >> 5)) & 1;
    lfsr = (lfsr >> 1) | (new_bit << 15);
    return lfsr
def prev(lfsr):
    out_bit = (lfsr >> 15) & 1;
    new_bit = (out_bit ^ (lfsr >> 1) ^ (lfsr
        >> 2) ^ (lfsr >> 4) ) & 1;
    lfsr = ((lfsr << 1) | new_bit) & 0xFFFF;
    return lfsr
```

Figure 2:
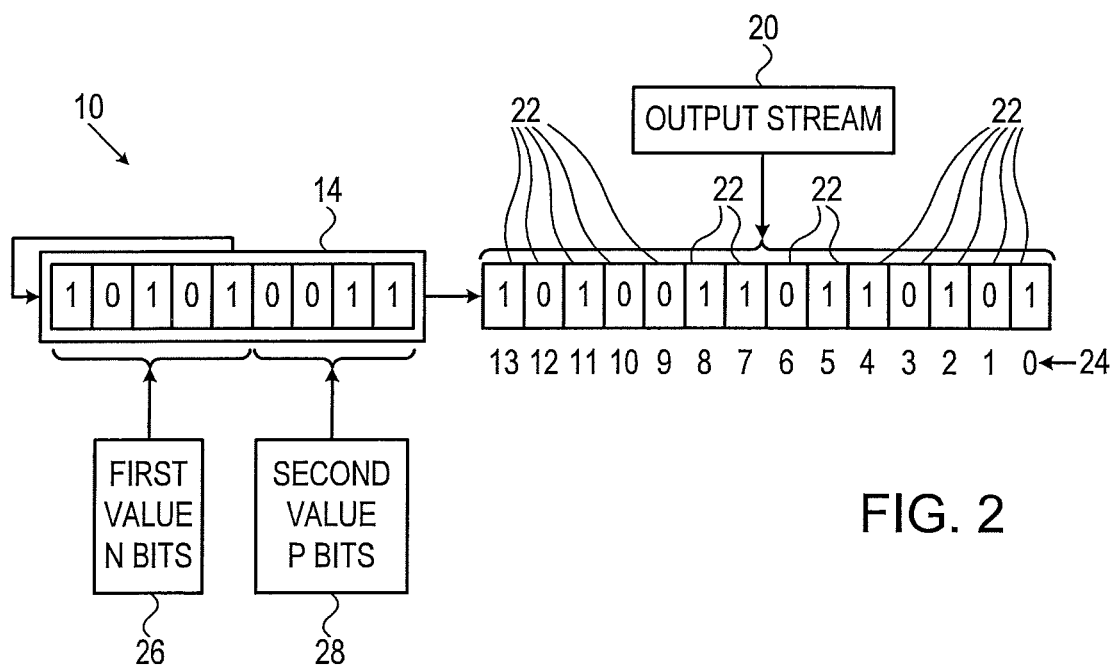
FIG. 2 is a partly pictorial, partly block diagram view of the LFSR of FIG. 1 generating an output stream.

Reference is now made to FIG. 2, which is a partly pictorial, partly block diagram view of the LFSR 14 of FIG. 1 generating an output stream 20.

In order to generate the watermark, the LFSR 14 is advanced as necessary generating the output stream 20.

The output stream 20 includes a plurality of data values (bits) 22. Each of the data values 22 has an absolute offset 24 measured in relation to the beginning of the output stream 20. By way of example, the first bit in the output stream 20 has an absolute offset of 0 and the second bit has an absolute offset of 1, etc.

Each time the LFSR 14 is advanced, the LFSR 14 has a new state. Therefore, the linear feedback shift register 14 typically has a plurality of states starting with the initial state 18 of FIG. 1. Each of the states includes a first value 26 of N bits and a second value 28 of P bits.

Figure 3:
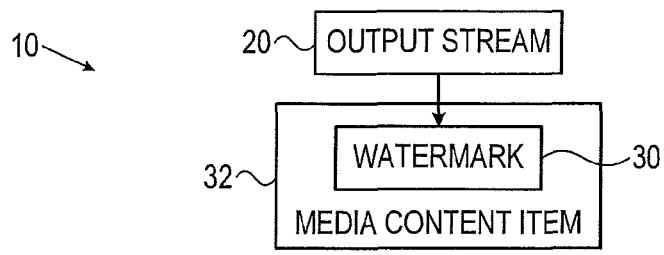
FIG. 3 is a partly pictorial, partly block diagram view of the output stream of FIG. 2 being embedded as a watermark in a media content item.

Reference is now made to FIG. 3, which is a partly pictorial, partly block diagram view of the output stream 20 of FIG. 2 being embedded as a watermark 30 in a media content item 32.

The watermarking system 10 is operative to embed at least some of the data values 22 (FIG. 2) of the output stream 20 as the watermark 30 in the media content item 32. Therefore, the watermark 30 encodes a series of the data values 22 of the output stream 20 of the LFSR 14 (FIG. 2).

By way of example only, the watermark 30 may be embedded into video by modifying the colors and/or the brightness of certain parts of the video based on the values of the output stream 20. By way of another example, the watermark 30 may be embedded into an e-book by modifying the character spacing and/or line spacing based on the values of the output stream 20.

The watermark 30 is typically embedded in such a way that the watermarking system 10 typically expects the data values 22 to be embedded in particular regions of the media content item 32, so that if during detection of the watermark 30 one or more of the particular regions is missing (e.g. a video frame is missing), certain data value(s) 22 of the embedded watermark 30 may also be missing.

Similarly, if during detection of the watermark 30, the system 10 cannot make a determination whether a data value 22 embedded in the watermark 30 is a 0 or a 1, then that data value 22 will be treated as a "corrupted" data value 22, described in more detail below. For example, if a 0 is encoded as a brightness value less than a first value and a 1 is encoded as a brightness value above a second value and the region of the media content item 32 where you expect there to be a data value 22 encoded therein does not fit the criteria for a 0 or a 1, then there will be a "corrupted" data value 22 in that region.

It should be noted that embedding and detection of the watermark may be performed in two different devices. For example, a watermark may be embedded by a media player operated by a user whereas the same watermark may be detected in a system operated by the content provider or distributor.

Figure 4:
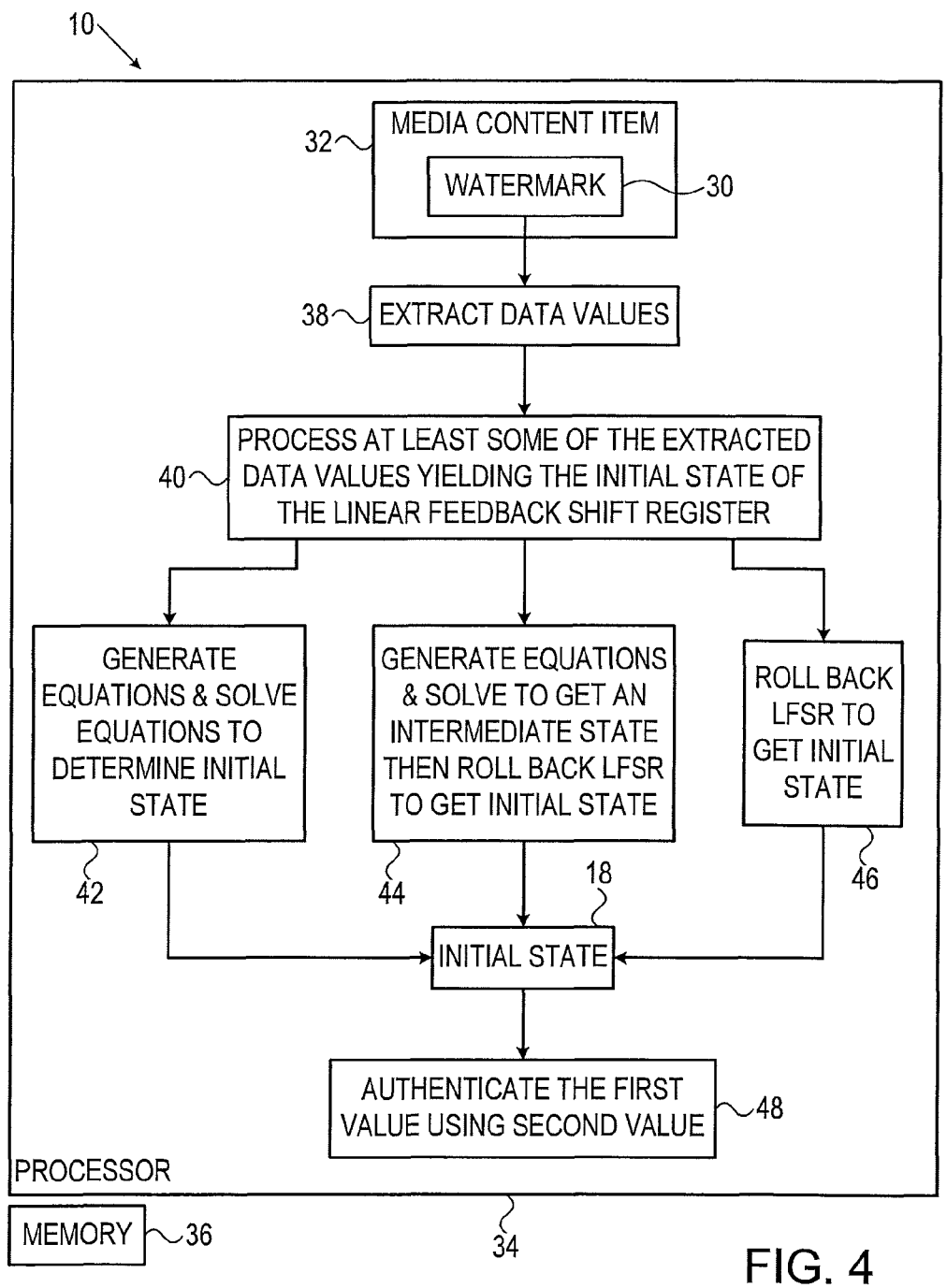
FIG. 4 is partly pictorial, partly block diagram view of the watermarking system of FIG. 1 extracting and verifying an information element.

Reference is now made to FIG. 4, which is partly pictorial, partly block diagram view of the watermarking system 10 of FIG. 1 extracting and verifying the information element 12 of FIG. 1.

The watermarking system 10 typically includes a processor 34 and a memory 36. The memory 36 is typically operative to store data used by the processor 34.

The processor 34 is typically operative to receive the media content item 32 including the watermark 30 embedded in the media content item 32.

The processor 34 is typically operative to identify at least part of the watermark 30 in the media content item 32 and extract at least some of the data values 22 (FIG. 2) from the identified watermark 30 (block 38). Any suitable watermark extraction method (taking into account how the watermark 30 was embedded) may be used as known to one ordinarily skilled in the art of watermark detection.

The processor 34 is typically operative to process at least some of the extracted data values 22 (FIG. 2) (block 40) yielding the initial state 18 of linear feedback shift register 14.

The process which yields the initial state 18 may include: (a) generating a plurality of equations based on a recursion mask of the linear feedback shift register 14 (FIG. 2) and the values and offsets of at least some of the extracted data values 22 and solving the equations to yield a state (initial state or intermediate state) of the linear feedback shift register 14; and/or (b) rolling back the linear feedback shift register 14 to the initial state 18. The exact nature of the processing of the extracted data values 22 (FIG. 2) will depend on various factors (such as whether the extracted data values 22 form an error-free interval of the series of the data values 22 and whether the absolute offsets of the extracted data values 22 are known) described in more detail below with references to FIG. 4 and FIGS. 5-8. By definition the error-free interval is a consecutive sub-series of the series of the data values 22.

In accordance with a first option, the processor 34 is typically operative to process at least some of the extracted data values 22 (FIG. 2) yielding the initial state 18 of the linear feedback shift register 14 by generating equations and solving the equations to determine the initial state 18 of the LFSR 14 (block 42). The first option is described in more detail with reference to FIGS. 5 and 7.

In accordance with a second option, the processor 34 is typically operative to process at least some of the extracted data values 22 (FIG. 2) yielding the initial state 18 of the linear feedback shift register 14 by generating equations and solving the equations to determine an intermediate state of the LFSR 14 and then rolling back the LFSR 14 from the intermediate state to the initial state 18 (block 44). The second option is described in more detail with reference to FIG. 8.

In accordance with a third option, the processor 34 is typically operative to process at feast some of the extracted data values 22 (FIG. 2) yielding the initial state 18 of the linear feedback shift register 14 by rolling back the LFSR 14 to the initial state 18 (block 46). The third option is described in more detail with reference to FIGS. 5 and 6.

The processor 34 is typically operative to authenticate the first value 26 (FIG. 2) of the initial state 18 using the second value 28 (FIG. 2) of the initial state 18 in order to confirm that the first value 26 of the initial state 18 is indeed the information element 12 (FIG. 1) which was included in the seed processed by the linear feedback shift register 14 (FIG. 2) yielding the output stream 20 (FIG. 2) which was embedded as the watermark 30 in the media content item 32 (block 48).

The processor 34 may authenticate the first value 26 (FIG. 2) using the second value 28 by calculating a cryptographic hash or a message authentication code or a CRC of the first value 26 and comparing the output with the second value 28 or by simply looking in a table of assurance values and corresponding information elements to see if the first value 26 is authenticated by the second value 28.

Figure 5:
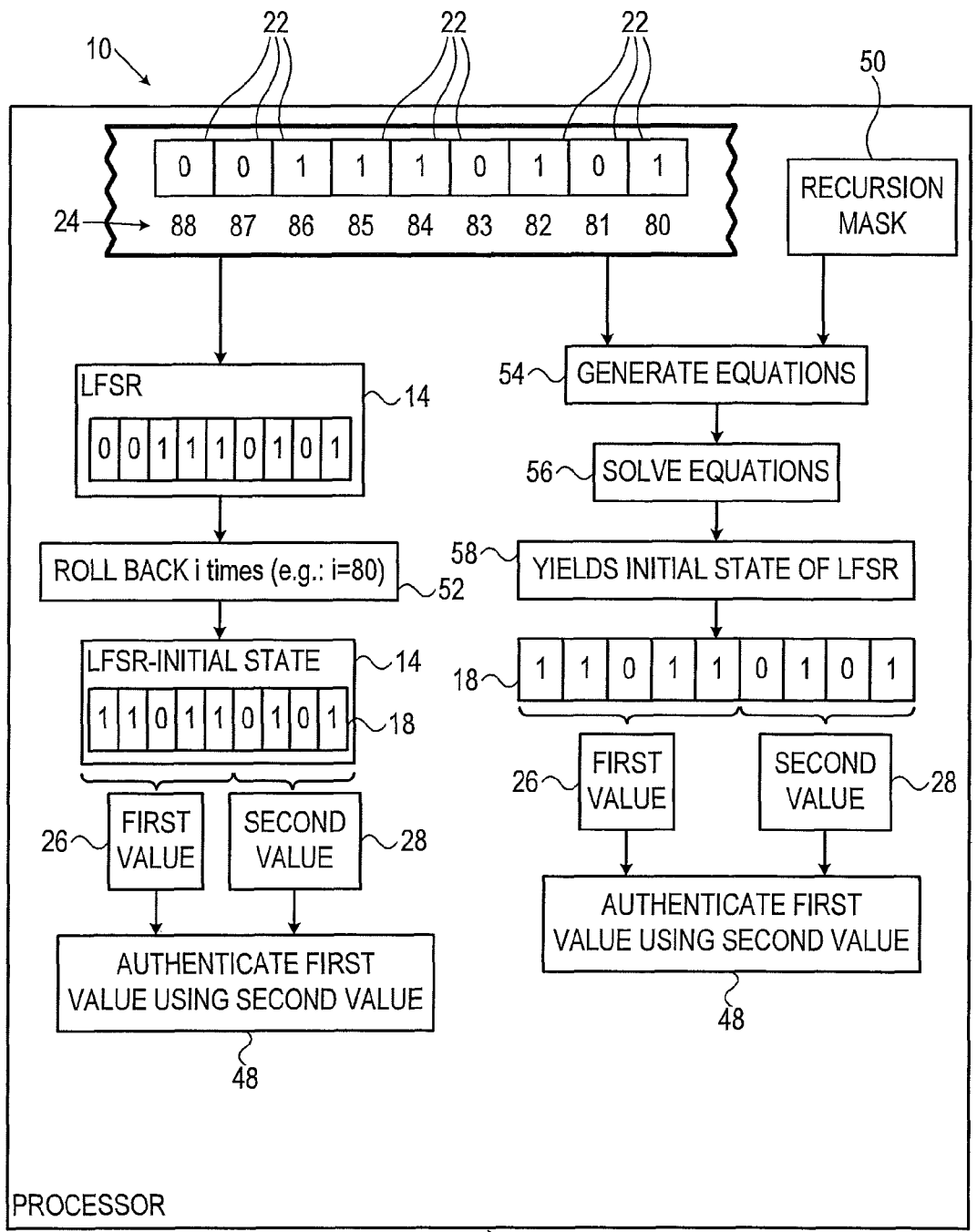
FIG. 5 is a partly pictorial, partly block diagram view of the watermarking system of FIG. 1 processing an error-free interval of data values with associated absolute offset values.

Reference is now made to FIG. 5, which is a partly pictorial, partly block diagram view of the watermarking system 10 of FIG. 1 processing an error-free interval of data values 22 with associated absolute offset values 24.

The absolute offset 24 of each of the data values 22 may be indicated by an indicator in the watermark 30. Alternatively, the absolute offset 24 of only certain data values 22 may be indicated by indicators in the watermark 30 and the absolute offset 24 of other data values 22 may be determined in relation to the available indicators.

By extracting/collecting more of the data values 22 than the length of the LFSR 14, the processor 34 may be operative to search the data values 22 for an error-free interval of data values 22 (having a length of at least N plus P bits) by checking a sliding window of the extracted data values 22 against a recursion mask 50 of the LFSR 14 to see if the data values 22 in the sliding window comply with the LFSR recursion mask 50. If there are errors in one or more of the data values 22 in the sliding window, the corrupted data values 22 may be discarded and the sliding window is moved forward until the data values 22 in the sliding window comply with the LFSR recursion mask 50.

If at least some of the data values 22 extracted from the watermark 30 represent an error-free interval of data values 22 of length N plus P bits within the series of the data values 22 and the absolute offset 24 of each of the data values 22 in the error-free interval is known, then the processor 34 is typically operative to process the error-free interval of the data values 22 in order to yield the initial state 18 of linear feedback shift register 14 either by rolling back the LFSR 14 or by solving equations. Both of these methods are described in more detail below.

If the absolute offsets 24 are unknown but the relative offsets are known then the method described with reference to FIG. 6 may be used.

Figure 7:
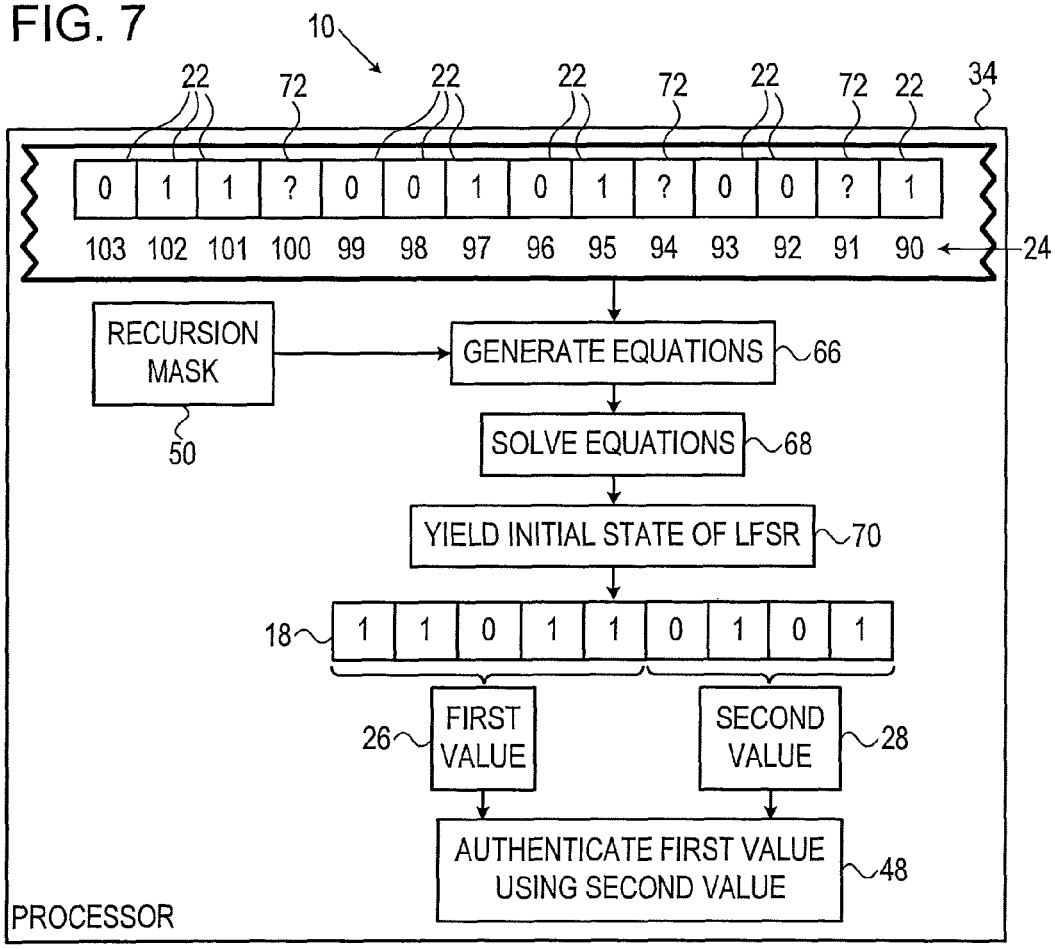
FIG. 7 is a partly pictorial, partly block diagram view of the watermarking system of FIG. 1 processing an interval of data values with associated absolute offset values and with missing bits and/or including errors.
Figure 8:
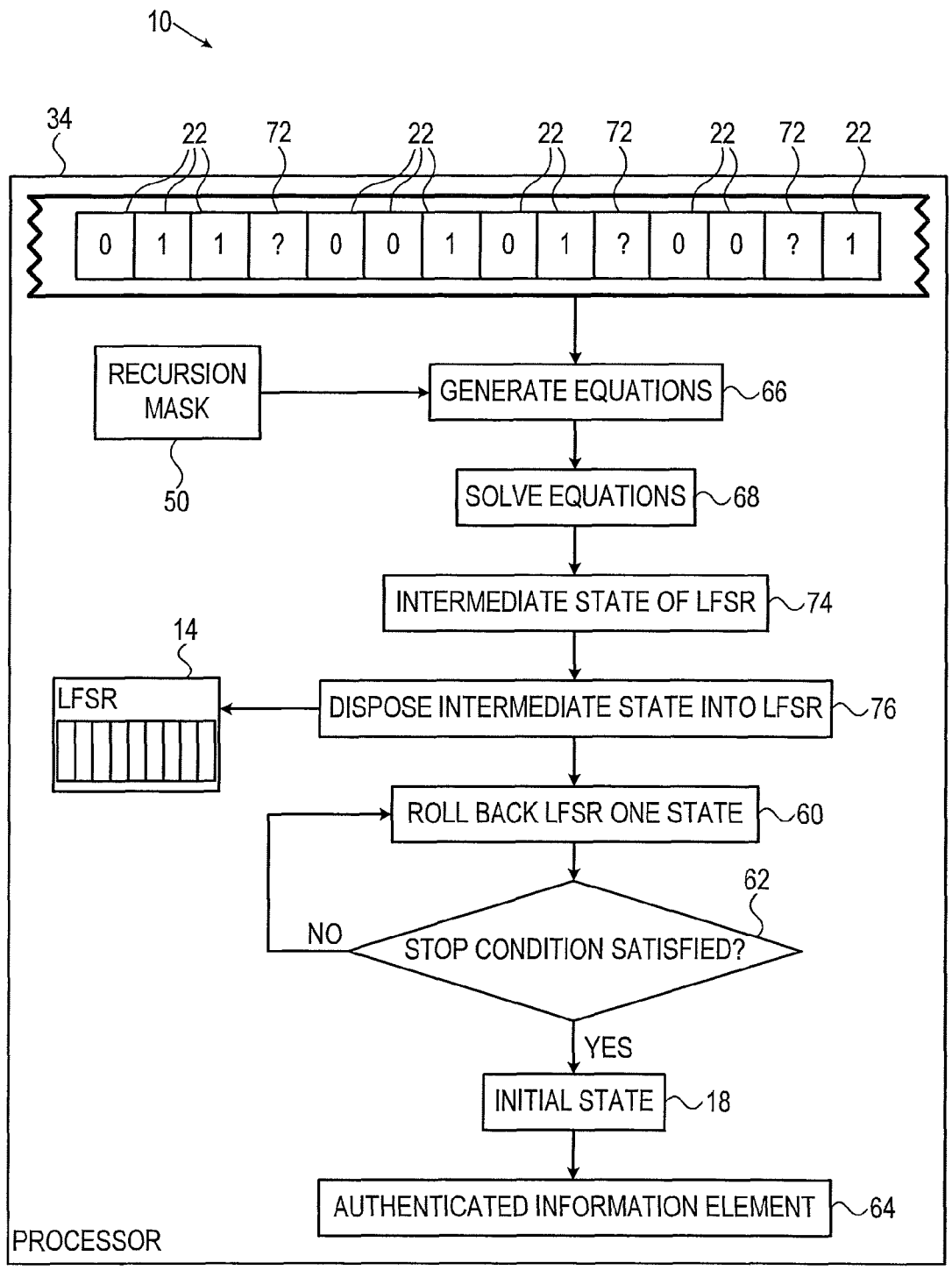
FIG. 8 is a partly pictorial, partly block diagram view of the watermarking system of FIG. 1 processing an interval of data values without absolute offset values and with missing bits and/or including errors.

If there are no sliding windows which provide an error-free interval of data values 22, then the method described with reference to FIG. 5 cannot typically be used. In such a case, the methods described with reference to FIGS. 7 and 8 may be used. FIG. 7 is relevant where the absolute offsets 24 are known and FIG. 8 is relevant to where the absolute offsets 24 are unknown but the relative offsets are known.

Rolling back the LFSR 14 is now described in more detail.

The processor 34 is typically operative to process at least some of the extracted data values 22, representing the error-free interval of data values 22, yielding the initial state 18 of linear feedback shift register 14 by a process including disposing the (at least some) extracted data values 22 in the linear feedback shift register 14 and rolling back the linear feedback shift register i times (block 52) to the initial state 18.

The value i is typically determined based on how many times the LFSR 14 was rolled forward from the initial state 18 to arrive at the error-free interval of data values 22. Therefore, the value i is based on the absolute offset 24 of one of the extracted data values 22 of the error-free interval. The exact absolute offset 24 to use for the value of i will typically depend on the mode of operation of the LFSR 14. In particular, it will depend on how the LFSR 14 updates its internal state and outputs the data values 22 in the output stream 20 (FIG. 2). In the example of FIG. 5, the value of i is 80, which is the absolute offset 24 of the data value 22 in the error-free interval which has the lowest absolute offset value 24 in the error-free interval.

Once the initial state 18 has been determined by the processor 34, the processor 34 is typically operative to authenticate the first value 26 of the initial state 18 using the second value 28 of the initial state 18 (block 48).

Determining the initial state 18 by generating and solving equations is now described in more detail below.

The processor 34 is typically operative to process at least some of the extracted data values 22, representing the error-free interval of data values 22, yielding the initial state 18 of linear feedback shift register 14 by a process including: (a) generating a plurality of equations based on the recursion mask 50 of the linear feedback shift register 14 and the values and absolute offsets of the (at least some) extracted data values 22 (block 54); and (b) solving the equations (block 56) to yield the initial state 18 of the linear feedback shift register 14 (block 58).

The system of equations solved is a linear system of the form $Ax=b$, where:

A is the coefficient matrix;

$x=(x\_0, x\_1, x\_N-1)$ is the vector of variables to be solved for; and $b=(b\_0, b\_1, b\_N-1)$ are the bits (data values 22) for which we know the absolute offsets.

The absolute position of bit $b\_j$ is defined to be $p\_j$.

If only relative offsets are known (which is relevant to the description of FIG. 8), then it is assumed that $p\_0=0$, and the equations are solved accordingly to arrive at the intermediate state.

The variables x to solve for are the seed/load of the LFSR of length N.

To construct the equations for the bits $b\_0, \ldots b\_N-1$ with absolute positions $p\_0, p\_N-1$, the coefficient matrix $A(i,j)$ is constructed as follows:

For each $i=0 \ldots N-1$:

Load the LFSR with a seed that is all zeros except for the bit position i which is set to 1.

Advance the LFSR as many times as needed (until the last position $\max(p\_0, p\_N-1)$).

If the output bit at position $p\_j$ is 1, then set $A(i,j)=1$, otherwise $A(i,j)=0$ Sometimes A might not be of full rank because the equations are not linearly independent, in which case a few more bits (and equations) will be needed (discarding those earlier equations which were linearly dependent).

Once the initial state 18 has been determined by the processor 34, the processor 34 is typically operative to authenticate the first value 26 of the initial state 18 using the second value 28 of the initial state 18 (block 48).

Figure 6:
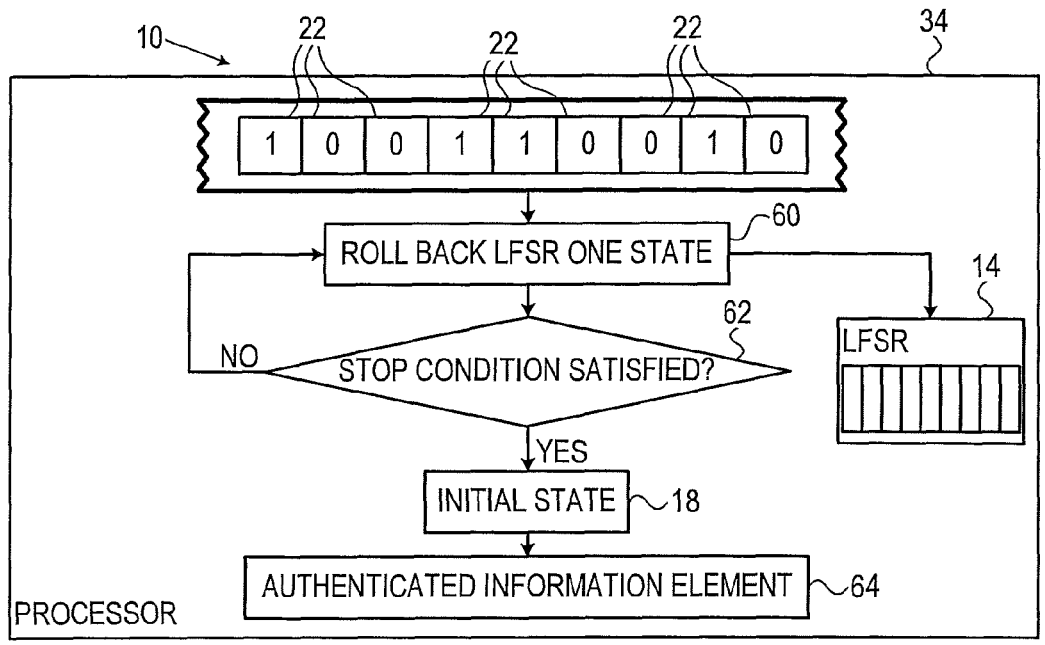
FIG. 6 is a partly pictorial, partly block diagram view of the watermarking system of FIG. 1 processing an error-free interval of data values without absolute offset values.

Reference is now made to FIG. 6, which is a partly pictorial, partly block diagram view of the watermarking system 10 of FIG. 1 processing an error-free interval of data values 22 without absolute offset values 24.

In FIG. 6, as the error-free interval of data values 22 does not include any indicators in relation to the absolute offsets of the data values 22, the absolute offset of the data values 22 of the error-free interval of data values 22 is unknown (but the relative offset of the data values 22 of the error-free interval of the series of data values 22 is known). Therefore, the value i used to determine how many times to roll back the LFSR 14 is also unknown.

The processor 34 is typically operative to process at least some of the extracted data values 22 of the error-free interval of the series of data values 22 yielding the initial state of linear feedback shift register 14 by a process including: (a) disposing the (at least some) extracted data values 22 in the linear feedback shift register; and (b) rolling back the linear feedback shift register one state at a time until a stop condition is satisfied (block 60). The processor 34 is operative to check if the stop condition has been satisfied each time the linear feedback shift register 14 is rolled back by one state (block 62). The stop condition is satisfied when the current state of the linear feedback shift register is equal to the initial state 18 given by positively authenticating the first value 26 (FIG. 2) of the current state using the second value 28 (FIG. 2) of the current state and thereby authenticating the information element 12 (FIG. 1) (block 64).

Reference is now made to FIG. 7, which is a partly pictorial, partly block diagram view of the watermarking system of FIG. 1 processing an interval of data values 22 with associated absolute offset values 24 but with missing bits and/or including errors 72.

If the data values 22 collected are non-consecutive (due to one or more errors and/or one or more missing bits 72 and therefore do not represent an error-free interval of the data values 22 within the series of data values 22), but the absolute offsets 24 of the collected/extracted data values 22 within the output stream 20 of the LFSR 14 are known, and enough linearly independent data values 22 have been collected (normally, as many bits as the size of the LFSR 14 (FIG. 2), or one or two more), the initial state 18 of the LFSR 14 can be computed by generating and solving linear equations for each of the extracted/collected data values 22.

The processor 34 is typically operative to process at least some of the extracted data values 22 yielding the initial state 18 of linear feedback shift register 14 (FIG. 2) by a process including: generating the equations based on the recursion mask 50 of the linear feedback shift register 14 (FIG. 2) and the values and absolute offsets 24 of the (at least some) extracted data values 22 (block 66); and solving the equations (block 68) to yield the initial state 18 of the linear feedback shift register 14 (block 70).

Once the initial state 18 has been determined by the processor 34, the processor 34 is typically operative to authenticate the first value 26 of the initial state 18 using the second value 28 of the initial state 18 (block 48).

Reference is now made to FIG. 8, which is a partly pictorial, partly block diagram view of the watermarking system 10 of FIG. 1 processing an interval of the data values 22 without absolute offset values and with missing bits and/or including errors 72.

If the data values 22 collected are non-consecutive (due to one or more errors and/or one or more missing bits 72 and therefore do not represent an error-free interval of the data values 22 within the series of data values 22), and the absolute offsets 24 of the collected/extracted data values 22 within the output stream 20 of the LFSR 14 are unknown, but the relative offsets among the collected/extracted data values 22 are known (for example by assuming that the absolute offset of a certain one of the extracted bits is a certain value, such as zero, and then defining the offsets of the other data values 22 in relation to that certain extracted bit) and enough linearly independent data values 22 have been collected (normally, as many bits as the degree of the LFSR 14, or one or two more), an intermediate state 74 of the LFSR 14 can be computed by generating and solving linear equations for each of the extracted/collected data values 22. The intermediate state 74 is typically the state of the LFSR 14 starting at the position of the first extracted data value 22 used to generate the equations.

The intermediate state 74 is then disposed in the LFSR 14 which is rolled back to the initial state 18.

The above is now described in further detail.

The processor 34 is operative to process at least some of the extracted data values 22 yielding the initial state 18 of linear feedback shift register 14 by a process including: (a) generating the equations based on the recursion mask 50 of the linear feedback shift register 14 and the values and relative offsets of the (at least some) extracted data values 22 (block 66); (b) solving the equations to yield the intermediate state 74 of the linear feedback shift register 14 (block 68); and disposing the intermediate state 74 into the LFSR 14 (block 76); and then rolling back the linear feedback shift register 14 from the intermediate state 74 one state at a time until a stop condition is satisfied (block 60). The processor 34 is operative to check if the stop condition has been satisfied each time the linear feedback shift register 14 is rolled back by one state (block 62). The stop condition is satisfied when a current state of the linear feedback shift register is equal to the initial state 18 given by positively authenticating the first value 26 (FIG. 2) of the current state using the second value 28 (FIG. 2) of the current state and thereby authenticating the information element 12 (FIG. 1) (block 64).

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A system comprising: a hardware processor; and a memory to store data used by the hardware processor, wherein the hardware processor is operative to:
receive a media content item including a watermark embedded in the media content item, the watermark encoding a series of data values of an output stream of a linear feedback shift register initialized with a seed including an information element and an assurance value, the information element consisting of N bits, the assurance value consisting of P bits, the linear feedback shift register having a plurality of states including an initial state, each of the states including a first value of N bits and a second value of P bits;
identify at least part of the watermark in the media content item;
extract two or more data values of the data values from the at least part of the identified watermark;
process two or more extracted data values of the extracted data values yielding the initial state of the linear feedback shift register including: generating a plurality of equations based on the two or more extracted data values and an offset of each of the two or more extracted data values and a recursion mask of the linear feedback shift register and solving the equations to yield a first state of the states of the linear feedback shift register; and/or rolling back the linear feedback shift register to the initial state; and
based on determining the initial state via the rolling back and/or solving the equations: authenticate the first value of the initial state using the second value of the initial state; confirm that the first value of the initial state is indeed the information element which was included in the seed processed by the linear feedback shift register; and provide a positive identification of an illegitimate distributor of the media content item.

2. The system according to claim 1, wherein the hardware processor is operative to process the two or more extracted data values yielding the initial state of the linear feedback shift register by a process including: generating the plurality of equations based on the recursion mask of the linear feedback shift register and the two or more extracted data values and the offsets of each of the two or more extracted data values; and solving the equations to yield the first state of the linear feedback shift register.

3. The system according to claim 2, wherein an absolute offset of each of the two or more extracted data values within the series of data values of the output stream of the linear feedback shift register is known, the hardware processor being operative to: generate the equations based on the recursion mask of the linear feedback shift register and the two or more extracted data values and the absolute offsets of each of the two or more extracted data values; and solve the equations to yield the initial state of the linear feedback shift register.

4. The system according to claim 3, wherein the two or more extracted data values do not represent an error-free interval of data values within the series of data values.

5. The system according to claim 2, wherein the two or more extracted data values represent an error-free interval of the data values within the series of data values.

6. The system according to claim 2, wherein an absolute offset of the two or more extracted data values within the series of data values of the output stream of the linear feedback shift register is unknown, but a relative offset of each of the two or more extracted data values within the series of data values of the output stream of the linear feedback shift register is known, the hardware processor being operative to:
generate the equations based on the recursion mask of the linear feedback shift register and the two or more extracted data values and the relative offsets of each of the two or more extracted data values;
solve the equations to yield an intermediate state of the states of the linear feedback shift register; and then
roll back the linear feedback shift register from the intermediate state one state at a time until a stop condition is satisfied, wherein the hardware processor is operative to check if the stop condition has been satisfied each time the linear feedback shift register is rolled back by the one state, the stop condition being satisfied when a current state of the states of the linear feedback shift register is equal to the initial state given by positively authenticating the first value of the current state using the second value of the current state.

7. The system according to claim 1, wherein the two or more extracted data values represent an error-free interval of data values within the series of data values, the hardware processor being operative to process the two or more extracted data values yielding the initial state of the linear feedback shift register by a process including disposing the two or more extracted data values in the linear feedback shift register and rolling back the linear feedback shift register to the initial state.

8. The system according to claim 7, wherein an absolute offset of the two or more extracted data values within the series of data values of the output stream of the linear feedback shift register is known, the hardware processor being operative to roll back the linear feedback shift register i times, i being determined based on the absolute offset of one of the two or more extracted data values.

9. The system according to claim 7, wherein an absolute offset of the two or more extracted data values within the series of data values of the output stream of the linear feedback shift register is unknown, but the relative offset of the two or more extracted data values within the series of data values of the output stream of the linear feedback shift register is known, the processor being operative to roll back the linear feedback shift register one state at a time until a stop condition is satisfied, wherein the processor is operative to check if the stop condition has been satisfied each time the linear feedback shift register is rolled back by the one state, the stop condition being satisfied when a current state of the states of the linear feedback shift register is equal to the initial state given by positively authenticating the first value of the current state using the second value of the current state.

10. The system according to claim 1, wherein the assurance value is a function of the information element.

11. The system according to claim 1, the linear feedback shift register is a maximum recursion linear feedback shift register.

12. The system according to claim 1, wherein the hardware processor is operative to check the two or more data values against the recursion mask of the linear feedback shift register to find an error-free interval of the data values within the series of data values, the interval having a length of at least N plus P bits, wherein the hardware processor is operative to process the error-free interval of the data values in order to yield the initial state of the linear feedback shift register.

13. A method comprising:
receiving, on a hardware processor, a media content item including a watermark embedded in the media content item, the watermark encoding a series of data values of an output stream of a linear feedback shift register initialized with a seed including an information element and an assurance value, the information element consisting of N bits, the assurance value consisting of P bits, the linear feedback shift register having a plurality of states including an initial state, each of the states including a first value of N bits and a second value of P bits;

identifying, by the hardware processor, at least part of the watermark in the media content item;

extracting, by the hardware processor, two or more data values of the data values from the at least part of the identified watermark;

processing, by the hardware processor, two or more extracted data values of the extracted data values yielding the initial state of the linear feedback shift register;

generating, by the hardware processor, a plurality of equations based on the two or more extracted data values and an offset of each of the two or more extracted data values and a recursion mask of the linear feedback shift register and solving the equations to yield a first state of the states of the linear feedback shift register; and/or rolling back the linear feedback shift register to the initial state; and based on determining the initial state via the rolling back and/or solving the equations: authenticating the first value of the initial state using the second value of the initial state; confirming that the first value of the initial state is indeed the information element which was included in the seed processed by the linear feedback shift register; and providing the positive identification of the illegitimate distributor of the media content item.

14. The method according to claim 13, wherein the processing includes: generating the plurality of equations based on the recursion mask of the linear feedback shift register and the two or more extracted data values and the offsets of each of the two or more extracted data values; and solving the equations to yield the first state of the linear feedback shift register.

15. The method according to claim 1, wherein:
an absolute offset of the two or more extracted data values within the series of data values of the output stream of the linear feedback shift register is unknown, but a relative offset of each of the two or more extracted data values within the series of data values of the output stream of the linear feedback shift register is known;
the generating includes generating the equations based on the recursion mask of the linear feedback shift register and the two or more extracted data values and the relative offsets of each of the two or more extracted data values;
the solving includes solving the equations to yield an intermediate state of the states of the linear feedback shift register; and
the rolling back includes:
rolling back the linear feedback shift register from the intermediate state one state at a time until a stop condition is satisfied; and
checking if the stop condition has been satisfied each time the linear feedback shift register is rolled back by the one state, the stop condition being satisfied when a current state of the states of the linear feedback shift register is equal to the initial state given by positively authenticating the first value of the current state using the second value of the current state.

16. The method according to claim 13, wherein the two or more extracted data values represent an error-free interval of data values within the series of data values, the processing including the processing the two or more extracted data values yielding the initial state of the linear feedback shift register by a process including disposing the two or more extracted data values in the linear feedback shift register and rolling back the linear feedback shift register to the initial state.

17. The method according to claim 16, wherein an absolute offset of the two or more extracted data values within the series of data values of the output stream of the linear feedback shift register is known, the rolling back including rolling back the linear feedback shift register i times, i being determined based on the absolute offset of one of the two or more extracted data values.

18. The method according to claim 16, wherein:
an absolute offset of the two or more extracted data values within the series of data values of the output stream of the linear feedback shift register is unknown, but a relative offset of the two or more extracted data values within the series of data values of the output stream of the linear feedback shift register is known; and
the rolling back includes:
rolling back the linear feedback shift register one state at a time until a stop condition is satisfied; and
checking if the stop condition has been satisfied each time the linear feedback shift register is rolled back by the one state, the stop condition being satisfied when a current state of the states of the linear feedback shift register is equal to the initial state given by positively authenticating the first value of the current state using the second value of the current state.

* * * * *

UNITED STATES PATENT AND TRADEMARK OFFICE
CERTIFICATE OF CORRECTION

PATENT NO. : 9,208,352 B2  
APPLICATION NO. : 14/176400  
DATED : December 8, 2015  
INVENTOR(S) : Sella et al.

Page 1 of 1

It is certified that error appears in the above-identified patent and that said Letters Patent is hereby corrected as shown below:

In the specification  
In column 4, line 66, delete "feast" and substitute therefor --least--.  
In column 6, line 35, delete "x=(x_0, x_1, x_N-1)" and substitute therefor  
--x = (x_0, x_1, ..., x_N-1)--.  
In column 6, line 37, delete "b=(b_0, b_1, b_N-1)" and substitute therefor  
--b = (b_0, b_1, ..., b_N-1)--.  
In column 6, line 46, delete "p_0, p_N-1," and substitute therefor --p_0, ..., p_N-1,--.  
In column 6, line 53, delete "max(p_0, p_N-1))." and substitute therefor --max(p_0, ..., p_N-1)).--.  
In column 9, line 46, delete "offsets" and substitute therefor --offset--.  
In column 9, line 55, delete "offsets" and substitute therefor --offset--.  
In column 10, line 6, delete "offsets" and substitute therefor --offset--.  
In column 11, line 34, delete "offsets" and substitute therefor --offset--.  
In column 11, line 38, delete "claim 1," and substitute therefor --claim 14,--.  
In column 11, line 48, delete "offsets" and substitute therefor --offset--.

Signed and Sealed this  
Twenty-third Day of February, 2016

Michelle K. Lee  
*Director of the United States Patent and Trademark Office*